United States Patent
Simpson et al.

(10) Patent No.: US 6,512,592 B1
(45) Date of Patent: Jan. 28, 2003

(54) APPARATUS AND METHOD FOR GENERATING MULTIPLE ORIGINAL PRINTS

(75) Inventors: Shell S. Simpson, Boise, ID (US); Richard Detweiler, Boise, ID (US); Gerald A. Loyd, Boise, ID (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/303,071

(22) Filed: Apr. 30, 1999

(51) Int. Cl.[7] .............................................. G06K 15/00
(52) U.S. Cl. ...................................... 358/1.15; 358/1.16
(58) Field of Search ............................... 358/1.15, 1.16, 358/1.11, 1.1, 1.17, 444; 398/82, 83, 383, 148; 400/76, 71, 70, 61, 67; 399/145

(56) References Cited

U.S. PATENT DOCUMENTS 6,157,436 A * 12/2000 Cok ............................. 355/40

* cited by examiner

Primary Examiner—Arthur G. Evans
(74) Attorney, Agent, or Firm—Matthew L. Wade

(57) ABSTRACT

Disclosed is a printer for receiving a print job from a document processing device The print job including a preamble section, print data describing a single copy of a document and a trailer section. The trailer section including a command indicating the number of copies that are to be printed. The printer is adapted to receive the print job and operates to print the copies indicated by the command.

19 Claims, 6 Drawing Sheets

APPARATUS AND METHOD FOR GENERATING MULTIPLE ORIGINAL PRINTS

CROSS REFERENCE TO RELATED APPLICATIONS

This application includes subject matter related to co-pending application entitled: "Apparatus and Method for generating a print job from a series of commands describing multiple copies of a document" 10981933-1 and is referred to herein as the '933 application. That application is incorporated by reference herein, assigned to the same assignee as this application and filed on even date herewith.

BACKGROUND OF THE INVENTION

There are many types of computing devices capable of generating or handling a document in an electronic form. For purposes of this application, such devices are generally referred to herein as "document processing devices". Examples of document processing devices include personal computers, facsimile machines, digital cameras, digital copiers, optical scanners, medical imaging devices, satellite imaging devices and scientific data collection devices.

A typical printing system includes a document processing device and a printer connected over a communication link. The document processing device includes a software application (e.g., a word processing application) and a print driver. In order to generate a document in an electronic form, a user provides input (via some sort of user input device) to the software application (executing on the document processing device). To print the document, the user inputs a print request to the application. The application responds to this input by causing a series of commands describing the document to be transmitted to the print driver. For purposes of this application, the commands transmitted to the print driver may be referred to herein as "device driver interface" (DDI) commands or alternatively as the DDI command stream. The data used to represent a DDI command may be referred to herein as DDI command data.

It is often the case that a user has a need to print multiple collated copies of a document. Many printing systems exist today to provide a user with the ability to use one of two techniques to satisfy this need. First, the user can cause the document processing device to generate multiple print jobs, each print job describing only a single copy of the document. The print jobs (as they are generated) are transmitted sequentially over a communication link to a printer, thereby causing the printer to print the desired number of copies. Unfortunately, this first technique can result in a large amount of data having to be processed (both by the document processing device and by the printer) and a large amount of "print data" having to be transmitted over the communication link. As a result, this first technique can result in printing delays and data transfer bandwidth problems. It is noted that the phrase "print data" refers to electronic data in any form that is used to describe a document. Print data, for example, may be expressed in Printer Control Language (PCL), PostScript® (PostScript is a trademark of Adobe Systems Incorporated) or as a raster bitmap.

In a second technique, a user causes the document processing device to generate a single print job describing a single copy of the document. The print job is then transmitted once to the printer for printing. After the single copy is printed, the user then retrieves it from the printer and makes use of a photocopier to generate the additional copies desired. Unfortunately, this second technique typically requires the purchase, operation and maintenance of a photocopier. This represents an added expense beyond that of owning and maintaining a printer. Furthermore, user productivity is also reduced as the user must transport the original printed copy to the photocopier and must also spend time operating the photocopier. Also, the quality of the copies generated from a photocopier will typically be below that of the original document printed from the printer.

To solve the problems mentioned above, printing systems have been developed that allow for multiple copies of a document to be printed from a single transmission of a print job. The print job includes a single command (indicating the number of copies that are to be printed) followed by print data (describing a single copy of the document). Printers that are able to receive this type of print job are described in the patent entitled MULTIPLE ORIGINAL COPY DATA PRINTER, having U.S. Pat. No. 5,764,863. That patent is incorporated by reference. The technology described in that patent may be referred to as "TOPAZ". TOPAZ is an acronym for "transmit once, print a zillion". Prior art printers incorporating the TOPAZ technology are able to accept print jobs that include print data and a command, referred to herein as a "copy_count" command. The phrase "copy_count" command refers to any command in a print job that indicates the number of copies that are to be printed. This number may be referred to herein as the "copy count value".

For purposes of this discussion, a print job that includes a command indicating the number of times the print data in the print job is to be printed is referred to herein as a "mopy print job" (mopy is an acronym for "multiple original prints"). A printer able to receive a mopy print job may be referred to herein as a "mopy printer". A print driver that is able to generate a mopy print job may be referred to herein as a "mopy print driver".

As is known in the art, prior art mopy print jobs typically include setup commands that preface the print data. These setup commands can be expressed, for example, in Printer Job Language (PJL). For purposes of this application, the set of commands that preface the print data in a print job is referred to herein as the "preamble section" of the print job. Any commands that occur after the print data is referred to as the "trailer section" of the print job.

It is known in the art that prior art mopy printers require the copy_count command to be in the preamble section of the print job. This, therefore, requires the document processing device to transmit the copy_count command prior to transmitting the print data in a mopy print job to the printer. As a result, the number of copies that will be printed becomes fixed prior to the printer receiving the print data. This can be disadvantageous in situations wherein it would be desirable to determine or to update the copy count value during or after the transmission of the print data.

In order for a prior art mopy print driver to properly generate a mopy print job, it must receive a suitable set of DDI commands. For ease of discussion, such a set of DDI commands is referred to herein as a "mopy enabled" set of DDI commands. Typically, a mopy enabled set of DDI commands will include a DDI command indicating the number of copies that are to be printed, DDI commands that describe only a single copy of the document and DDI commands describing any desired finishing information (e.g., a DDI command indicating each copy is to be stapled). A mopy print driver receives these commands and generates the mopy print job. The mopy print job having a command indicating the number of copies that are to be printed, additional commands indicating finishing information and print data describing only a single copy of the document.

Unfortunately, some applications (referred to herein as "non-MOPY applications") are not designed to generate a mopy enabled set of DDI commands. To illustrate the problems a non-MOPY application can cause, consider the DDI commands listed in Table 1. The DDI commands in table 1 provide an example of a DDI command stream provided to a mopy print driver from a non-mopy application. In this example, it is assumed that the document being converted into a print job is a two page document and the user has requested (via input to the non-mopy application) two printed copies.

TABLE 1

| DDI Commands (in order received by print driver) | Comment |
|---|---|
| Start_Job Command | indicates new print job is to be generated |
| Start_Page Command | indicates start of a new page |
| {Page Description Commands} | DDI commands describing first page (first copy) |
| End_Page Command | Indicates end of page |
| Start_Page Command | |
| {Page Description Commands} | DDI commands describing second page (first copy) |
| End_Page Command | |
| Start_Page Command | |
| {Page Description Commands} | DDI commands describing first page (Second Copy) |
| End Page Command | |
| Start_Page Command | |
| {Page Description Commands} | DDI commands describing second page (Second Copy) |
| End_Page Command | |
| End_Job | Indicates end of print job |

It can be seen that the DDI commands listed in Table 1 describe two copies of the two page document. Unfortunately, however, the commands describing each copy of the document are in an "undifferentiated form". That is to say, there is no indication where the first set of DDI commands describing the first copy ends and the next set of DDI commands describing the second copy begins. Furthermore, there is no indication that more than one copy of the document is to be printed. For purposes of this discussion, such a DDI command stream is referred to herein as an "undifferentiated command stream". In addition, each set of DDI commands describing a single copy of the document is referred to herein as a "single copy command set".

Upon receiving an undifferentiated command stream, a typical prior art mopy print driver generates a single print job. The print job includes a command indicating one copy is to be printed followed by print data describing two copies of the document. The print job is then transmitted to the printer for printing. As a result, twice as much print data is transmitted to the printer for printing than that required to describe the document. As indicated above, this can cause data transfer bandwidth problems and printing delays. Of course this problem gets worse as the number of copies the user requests to be printed increases.

In addition, certain finishing operations that require knowledge of copy boundaries may be applied incorrectly during the printing operation. For example, if the DDI commands listed in table 1 further described a stapling operation, the resulting print job may cause the printer to generate two printed copies of the document with all four of the pages stapled together.

SUMMARY OF THE INVENTION

In one embodiment, a printer is provided that comprises a means for receiving a print job. The print job includes a preamble section, print data describing a document and a trailer section. The preamble section includes a first command indicating the print data is to be stored. The trailer section includes a second command indicating a first number of document copies are to be printed. The printer further comprises a memory, means for responding to the first command by storing the print data into the memory and means for responding to the second command by using the print data to print a second number of copies of the document.

In another embodiment a document processing device is provided comprising means for generating a document in an electronic form and means for converting the document into a print job, the print job including a preamble section. The preamble section includes a first command. The print job further includes print data describing the document and a trailer section that includes a second command. The first command is for causing a printer to store the print data and the second command is for causing the printer to print a first number of copies.

DETAILED DESCRIPTION OF THE INVENTION

Figure 1:
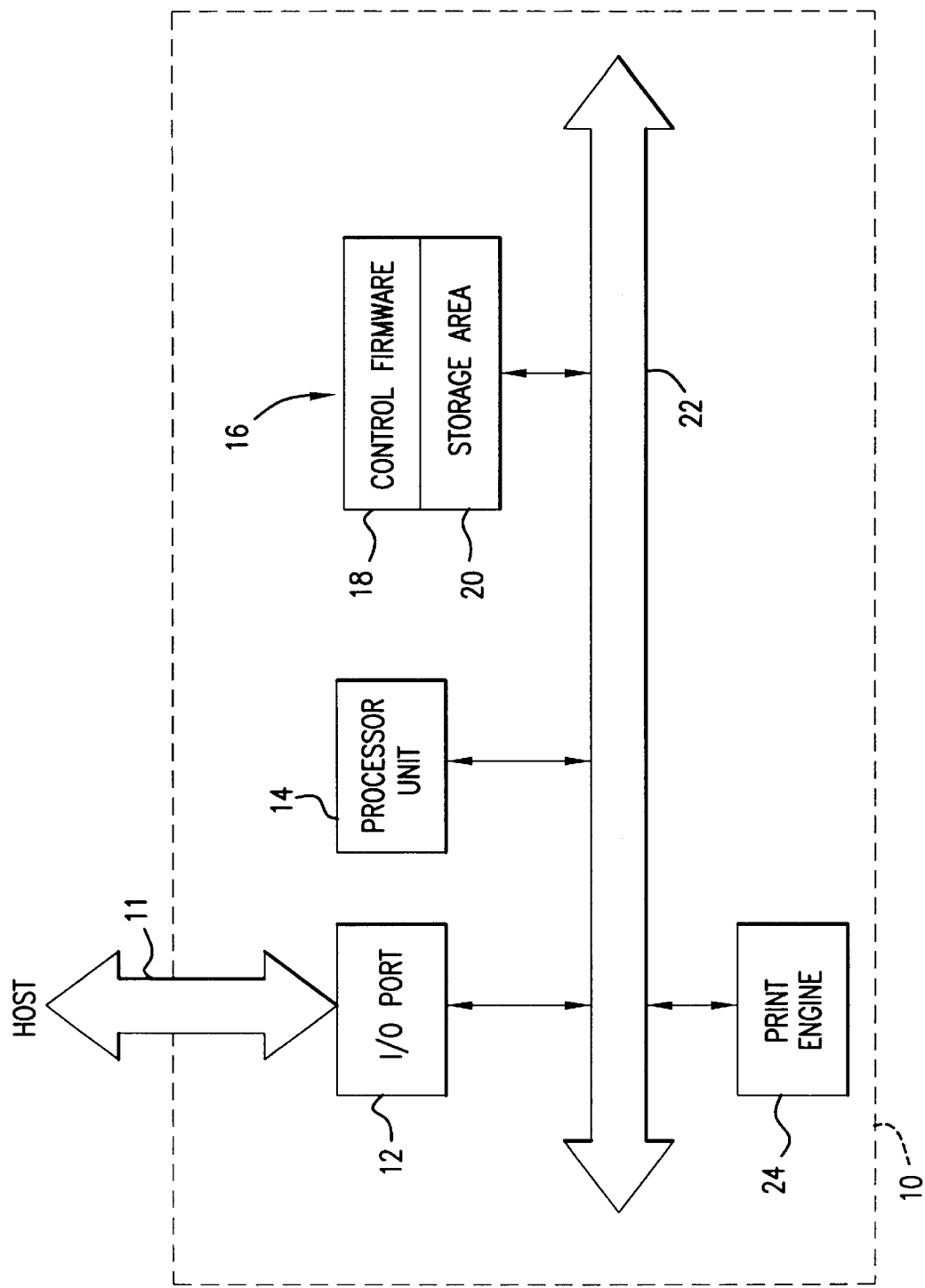
FIG. 1 is a high level circuit block diagram of a first embodiment of the present invention in the form of printer 10.

Turning now to FIG. 1, a high level circuit block diagram of a first embodiment of the present invention in the form of printer 10 is depicted. As shown, printer 10 includes an Input-Out (I/O) port 12, a processor unit 14, a memory 16 and print engine 24 all connected via bus 22. I/O port 12 provides printer 10 the ability to receive print jobs over communication link 11 from a document processing device, such as a personal computer. Communication link 11 may be, for example, a network. Print engine 24 may employ any number of well known technologies to generate printed output. For example, print engine 24 may be a standard laser engine, an ink-jet engine, an impact printer or a thermal printer.

Memory 16 may consist of one or more storage devices, such as one or more hard disk drives, read only memory (ROM) and random access memory (RAM). As shown, stored in memory 16 is control firmware 18 and storage area 20. In general, printer 10 is controlled by processor unit 14 under the direction of control firmware 18.

As will be explained in greater detail below, printer 10 is able to receive and to respond to a print job having a command structure generally indicated in Table 2. In this embodiment, these commands are expressed in Printer Job Control Language (PJL) and the print data is expressed in PCL. It is understood, however, that printers incorporating the present invention may be adapted to receive print jobs expressed in other languages.

TABLE 2

| Print Job command structure | Comments |
| --- | --- |
| @ PJL Job | Preamble section |
| @ PJL SET_ HOLD = {PRINT_AND_DEFER } | |
| {rest of preamble section} | |
| {print data} | Print Data describing each page in a document (e.g., PCL) |
| @ PJL COPY_COUNT = Copy Count value | Trailer section |
| {rest of trailer section} | |
| @ PJL EOJ | |

It is understood that the "@ PJL SET_HOLD=PRINT_AND_DEFER" represents an extension to the current PJL command set. This command is generally referred to herein as a "Print_and_defer" command. Furthermore, the "@ PJL COPY_COUNT=Copy count value" is the copy count command. Importantly, it can be seen that the copy_count command is in the trailer section of the print job. The response of printer 10 to these commands is discussed in detail below.

Figure 2:
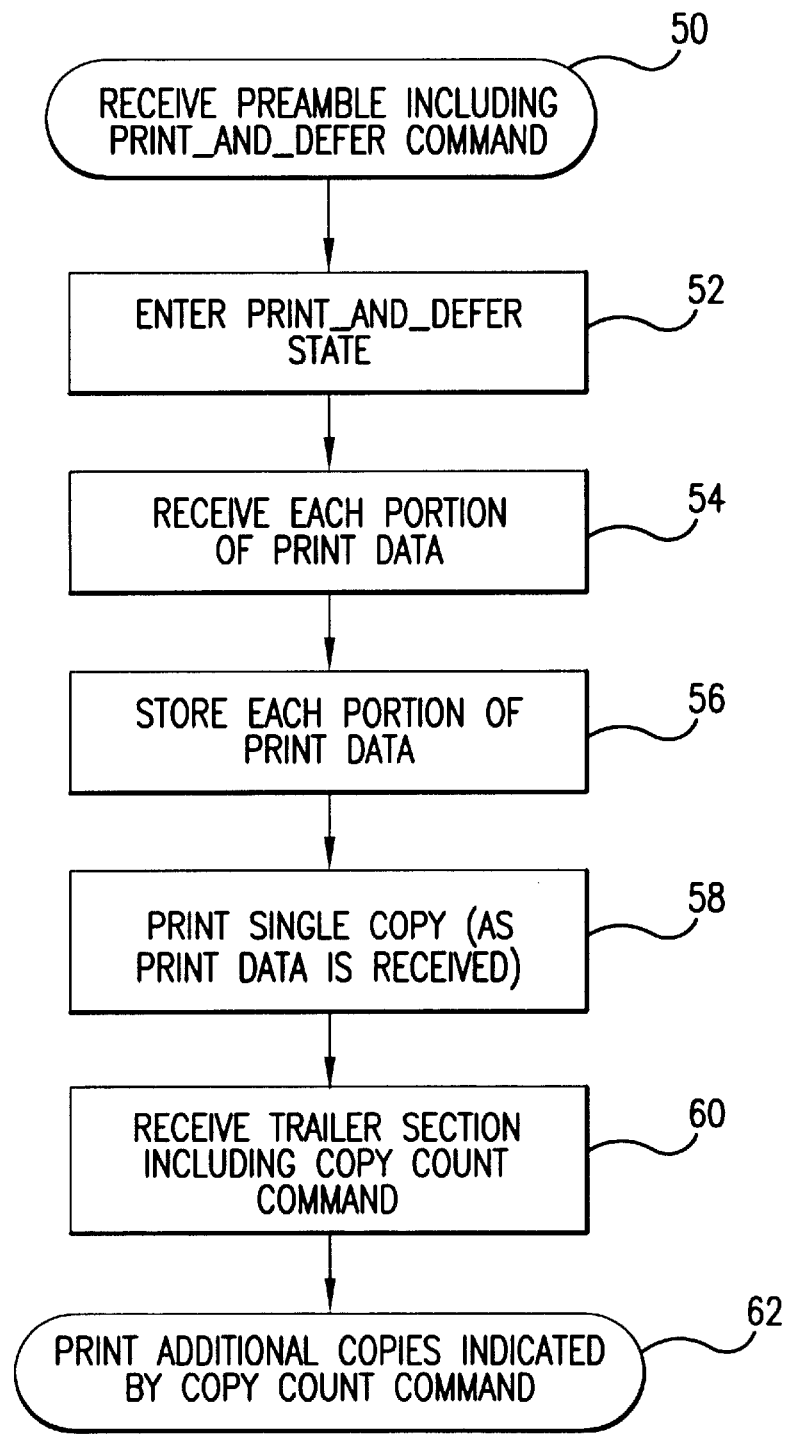
FIG. 2 depicts a flow diagram for describing the operation of printer 10 upon receiving a print job.

FIG. 2 provides a flow diagram to illustrate the operation of printer 10 upon receiving a print job, such as the one illustrated in Table 1, over communication link 11. It is assumed the print job includes a preamble section that includes a print_and_defer command, print data describing a document, and a trailer section that includes a copy_count command.

Referring now to FIG. 2, the operation of printer 10 begins upon receiving the preamble section of the print job (hereinafter after referred to as the "current print job") over communication link 11. (step 50). As previously indicated, the preamble section includes a "print_and_defer" command. Printer 10 responds to this command by entering a "print and defer state" (step 52). In general, while in a print and defer state, printer 10 is adapted to store the print data as it is received into storage area 20 and to also use the print data to generate a single copy of the document.

Thus, as the print data is received over communication link 11 (step 54), printer 10 operates to store it into storage area 20 (step 56) and also to use the print data to cause print engine 24 to print a single copy of the document (step 58).

After or during the printing of the single copy of the document, printer 10 then receives the trailer section of the print job (step 60) over communication link 11. As indicated above, the trailer section includes the copy_count command indicating the copy_count value. Printer 10 responds to the copy count command by using the print data (stored in storage area 20) to generate the additional copies of the document indicated by that command (step 62). Thus, for example, if the copy count command indicates a copy count value equal to "ten", then printer 10 performs step 62 by generating nine copies of the document (i.e., the copy count value less one) so that a total of ten copies of the document are printed for the current print job.

As just illustrated, the present invention provides a printer that is able to receive and respond to a copy count command that is received after the print data is received. Thus, the copy count value need not be known before the print data is transmitted and may even be determined during or after the transmission of the print data. As will be shown, this results in greater control over the printing operation and can provide printing systems having higher performance characteristics over the prior art.

One advantage of printer 10 is that it may be combined with the invention described in the '933 application to solve the problem mentioned above associated with non-mopy applications and to improve printing system performance. To illustrate, this important use of the present invention, some preliminary discussion is first provided and a second embodiment is then described.

Referring again to table 1, it is understood by a person skilled in the art that the page description commands for the first page (first copy) and the page description commands for the first page (second copy) are typically not identical, even though the two pages are identical. For example, it is often the case that the first page (first copy) page description commands will include DDI commands that provide the print driver with font information. These DDI commands are typically only transmitted once and are not included in the first page (second copy) page description commands. As is known in the art, however, there are certain page description commands that will be identical for two identical pages. For purposes of this application, these commands are referred to herein as "marking commands". In addition, the DDI command data describing marking commands for a page are referred to herein as the "marking data" for the page. Thus, it can be seen that in an undifferentiated DDI command stream describing multiple copies of a document, the marking data for the first page represented in the command stream (i.e., the first page, first copy of the document) will be identical to the marking data for the first page (second copy) of the document.

Typically, the marking commands for a page are generally those page description commands that define the marks that are to be printed on the page. It is also noted that marking commands for any one page can be identified by performing a relatively simple parsing routine to the page description commands for the page.

Figure 3:
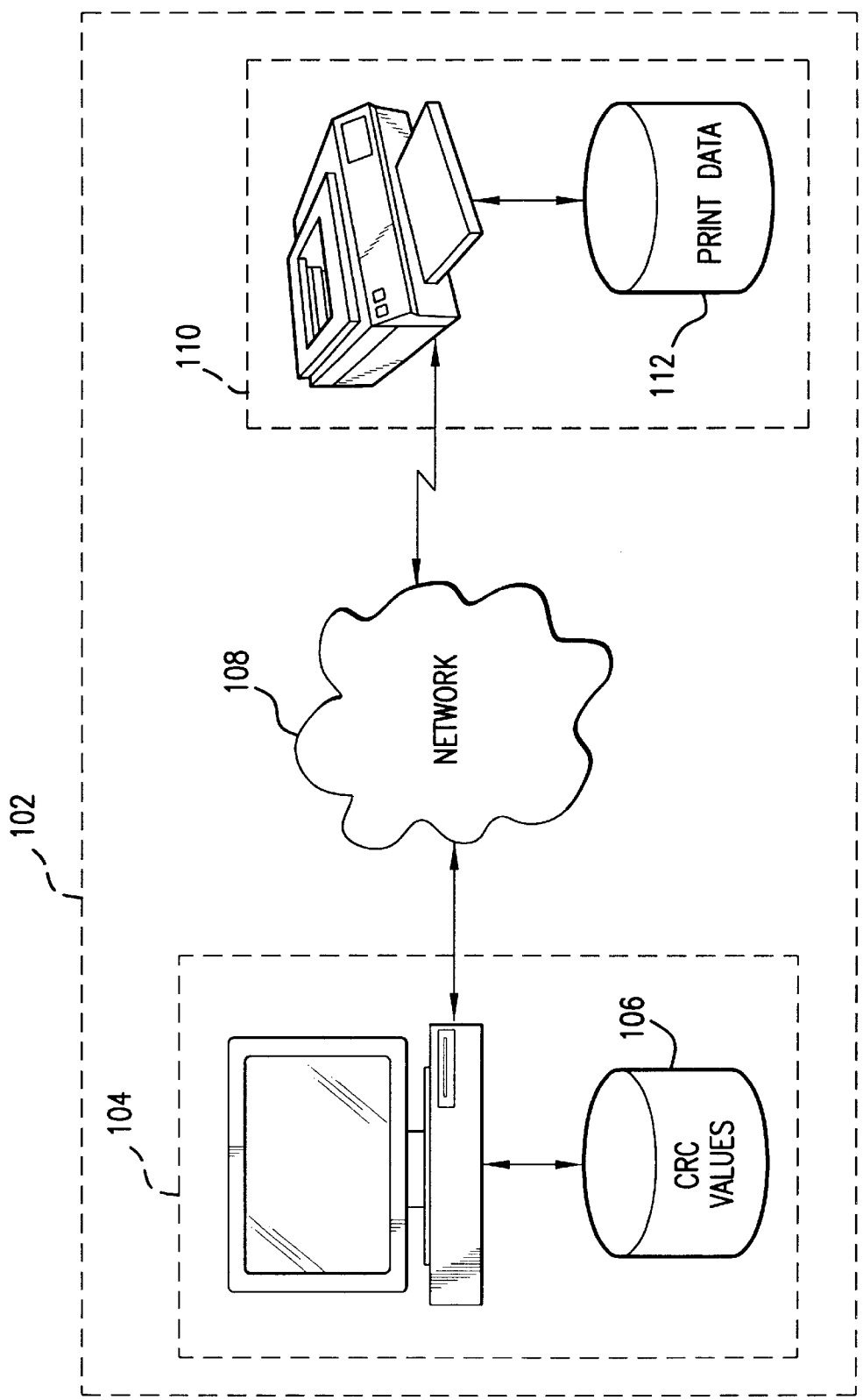
FIG. 3 illustrates printing system 102 which incorporates a second embodiment of the present invention.

FIG. 3 illustrates a printing system 102 which incorporates the second embodiment of the present invention. As shown, printing system 102 includes a document processing device (computer 104) and printer 110. Both devices are connected over network 108. Computer 104 includes memory 106 and printer 110 includes memory 112. Printer 110 operates in a similar manner to printer 10 of the first embodiment and is, therefore, able to receive and to respond to a print job having a command structure generally indicated in Table 2.

Figure 4:
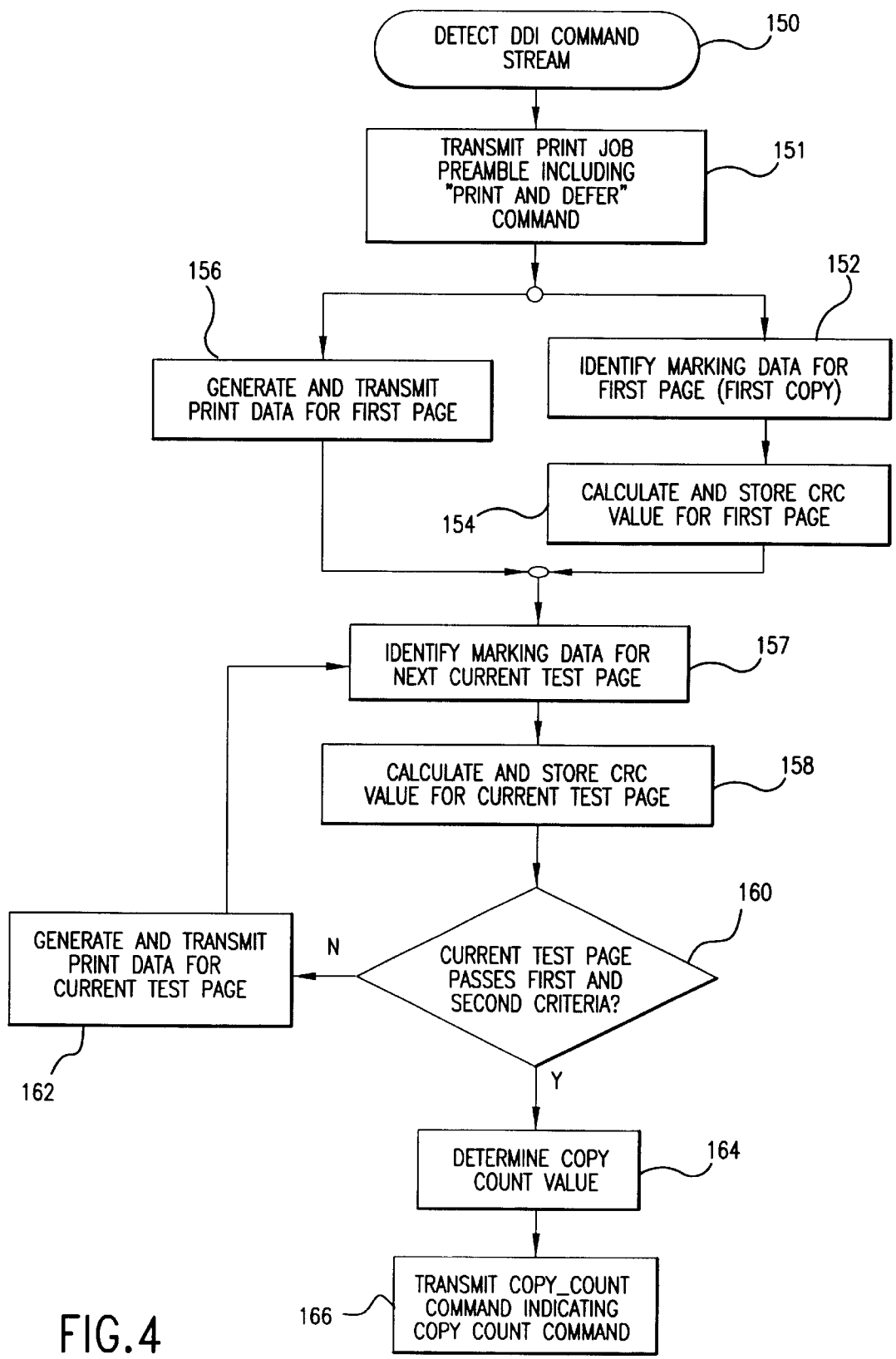
FIG. 4 depicts a flow diagram describing a routine followed by computer 104 for converting an undifferentiated DDI command stream into a mopy print job.

FIG. 4 illustrates, in the form of a flow diagram, a routine followed by computer 104 for converting an undifferentiated DDI command stream into a mopy print job. It is assumed that the DDI command stream is generated by a non-mopy application (in response to user input) and describes multiple copies of a document. It is noted that this routine may be implemented by computer 104 executing one or more software programs (e.g., a print driver program). It is further noted that these one or more programs may have been delivered to computer 104 via a separate computer readable medium, such as a diskette or CD ROM. Alternatively, the one or more programs may have been downloaded over network 108.

As shown in FIG. 3, the routine begins computer 104 detecting that an undifferentiated command stream is being generated by a non-mopy application (step 150). It is assumed in this description that the undifferentiated command stream describes multiple copies of a document.

Upon detecting the command stream, computer 104 generates and transmits the preamble section of a print job (step 151). Importantly, the preamble section includes a print_and_defer command. Upon receiving the print_and_defer command, printer 110 responds by entering a print_and_defer state.

After or during the transmission of the print job preamble, computer 104 operates to identify marking data (first page marking data) describing the marking commands for the first page represented in the command stream (step 152). As indicated above, this page is the first page (first copy). Also indicated above, the first page marking data may be identified by parsing the command data describing each marking command for the first page represented in the command stream. As the first page marking data is identified, Computer 104 operates to calculate and store into memory 106 a CRC value for the first page marking data (steps 154).

Importantly, as steps 152 and 154 are performed, computer 104 also operates to convert the DDI commands (i.e., the page description commands) describing the first page represented in the command stream into print data and to transmit the print data over network 108 to printer 110 (step 156). Because printer 110 is in a print_and_defer state, printer 110 responds to receiving this print data (referred to herein as "first page print data") into storage area 112 and using it to generate the first page of the document. Thus, as computer 104 further processes the command stream, printer 110 operates in parallel to print the first page.

Computer 104 then performs an iterative operation so as to identify the very next page represented in the command stream that meets two criteria. In general a page that meets the two criteria is referred to herein as a "boundary page". A boundary page is assumed to be the first page (second copy) of the document.

The iterative operation begins upon computer 104 identifying the marking data for a "current test page" (iterative step 157). For ease of discussion, a page that is currently being tested by computer 104 is referred to as a "current test page. For this first iteration, the current test page is the next page after the first page represented in the command stream. Computer 104 then calculates a CRC value for this set of marking data and stores it into memory 106 (iterative step 158).

Computer 104 then determines if the current test page meets the two criteria (decision step 160). A current test page meets the first criterion if the page is identical to the first page in the document. In order to make this determination, computer 104 first determines if the marking data for the current test page is identical to the marking data for the first page. In this embodiment, this is accomplished by computer 104 determining if the CRC value calculated for the first page is equal to the CRC value calculated for the current test page. If computer 104 determines that the two CRC values are equal, then the current test page is determined to meet the first criteria (i.e., the current test page is identical to the first page).

Figure 5:
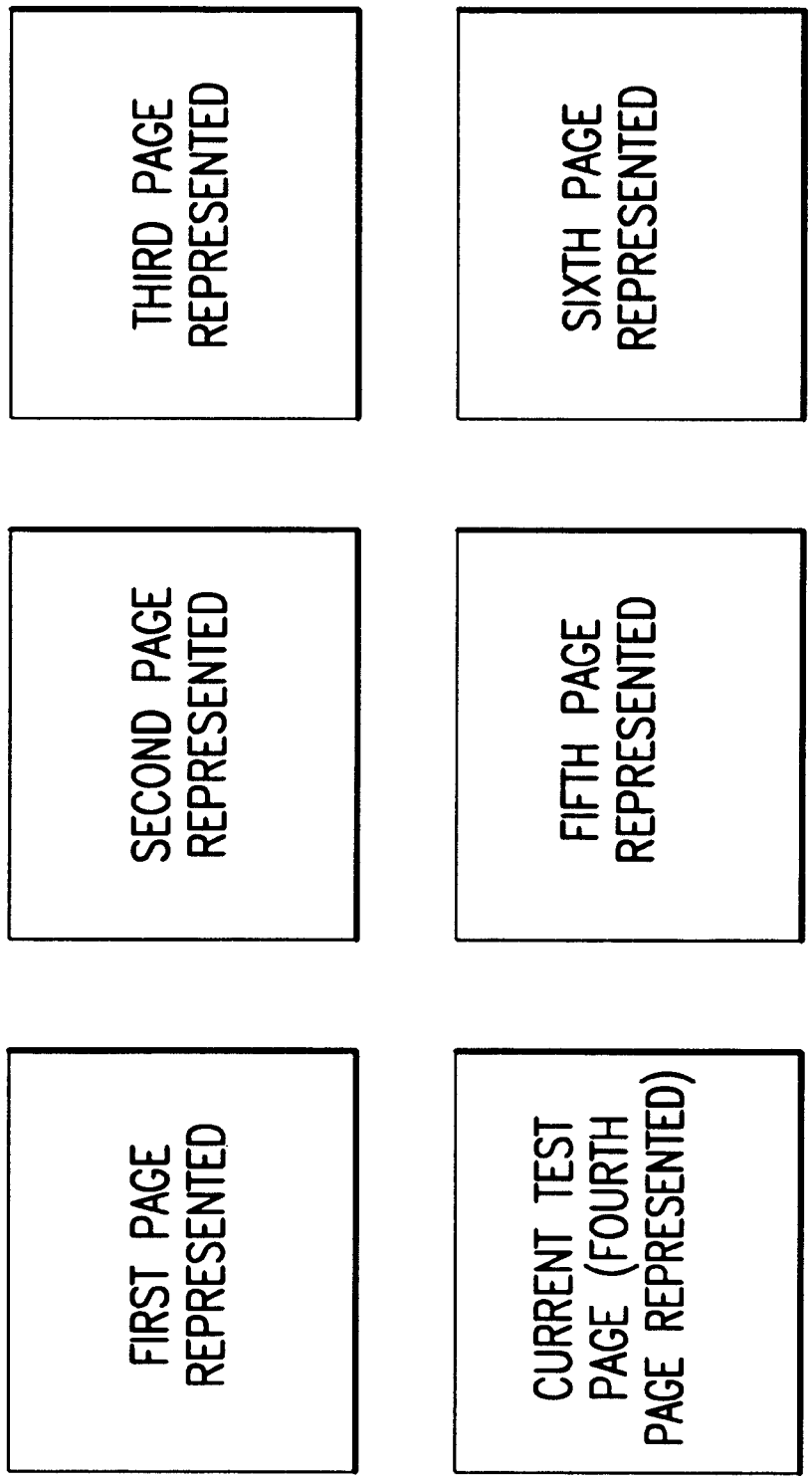
FIG. 5 illustrates an example of six pages in the order each page is represented in a typical undifferentiated command stream.

Before describing how the current test page meets the second criterion, some preliminary discussion is first provided. FIG. 5 illustrates an example of six pages in the order each page is represented in a typical undifferentiated command stream generated by a non-mopy application and describing multiple copies of a document. Thus, as indicated the first page represented in the command stream is the first page (first copy) of a document. It is assumed, in this example, that the fourth page represented is a current test page that meets the first criterion. Thus, the fourth page was determined to be identical to the first page (first copy) of the document.

It can be seen that if the current test page depicted in FIG. 5 is actually the first page (second copy) of the document, then the fifth page represented in the command stream should be identical to the second page represented in the command stream. Or, to put it another way, the fifth page and second page represented in the command stream would both be the second page of the document. Likewise, the sixth page should be identical to the third page as both of these pages would represent the third page of the document. For ease of discussion, two or more pages that should be identical if the current test page is the first page (second copy) of the document are referred to herein as an "associated page set" for the current test page.

Thus, in this example, the fifth page and the second page represented in the command stream make up a first associated page set. The sixth page and the third page represented in the command make up a second associated page set. It can be seen that if the pages in any associated page set for the current test page are not identical, then the current test page could not be the first page (second copy) of the document. Instead, the current test page is a page in the document that is identical to the first page of the document.

Referring again to FIG. 4, in the present embodiment, a current test page meets the second criterion only if it meets the first criterion and one of the following conditions exist:

(a) the current test page is non-blank; or
(b) each associated page set (for the current test page) that is tested consists of identical pages.

It is noted that computer 104, in the present embodiment, tests an associated page set by identifying the marking data for each page in a set, calculating a CRC value for each set of marking data and then comparing the two CRC values to determine if the two values are identical. If the two CRC value are determined to be identical, then computer 104 determines that the two pages in the set are then determined to be identical. Of course, computer 104 only tests the one or more associated page sets if the first condition (i.e., the current test page is non-blank) listed above is found not to exist.

It is noted that the number of associated page sets that are tested before computer 104 determines that the current test page meets the second criteria is a design choice and is related in part to the degree of certainty desired that the current test page is indeed the first page (second copy) of the document. In this embodiment, the first associated page set that is tested includes the first page represented in the command stream after the current test page. Whether or not a second associated page set is tested is dependent upon whether or not the first associated page set consists of non-blank pages. If the associated page set consists of non-blank pages, then computer 104 does not test additional associated page sets. If the first associated page set consists of blank pages, then computer 104 tests a second associated page set. The second associated page includes the second page represented in the command stream after the current test page. This continues until computer 104 tests an associated page set that consists of pages that are non-blank or the associated page sets represented in the command stream are exhausted.

If computer 104 determines that the current test page does not meet the first and second criteria (decision step 160), then the DDI commands that describe the current test page are converted into print data and the print data is transmitted to printer 110 (iterative step 162). Because Printer 110 is in the print_and_defer state for the current print job, printer 10 responds to receiving this print data by both storing the data into storage area 112 and printing the page. This page is, of course, the next page in the document. Computer 104 then repeats the iterative steps just described for the next page represented in the command stream. It is understood that for each iterative operation, computer 104 transmits print data describing a single page to printer 110. In this manner, a single copy of the document is generated.

Upon computer 104 determining that a current test page meets the first and second criteria (decision step 160) (i.e., a boundary page has been identified) a copy count value is then determined (step 164). This may be determined by counting the total number (first number) of pages represented in the command stream prior to the boundary page. In addition, the total number (second number) of pages represented in the command stream is also determined. The copy count is then set equal to the first number divided by the second number.

After the copy count value is determined, computer 104 then transmits the trailer section of the print job to printer 110 (step 166). The trailer section including a copy_count command indicating the copy count value. Printer 110 responds to this command by using the stored print data to generate the additional copies indicated by that command. Thus, for example, if the copy count value is equal to "ten", then printer 110 uses the stored print data to generate nine copies so that a total of ten copies are printed for the current print job.

It can be seen, from this second embodiment, that the present invention combined with the invention described in the '933 application results in improved printing system performance. For example, as just shown, the printer 110 can receive print data prior to receiving the copy count command when in a print and defer state. Thus, in this manner, the time to first page out is reduced as compared to the case wherein computer 104 is adapted to operate with a prior art mopy printer. This is because computer 104 can transmit print data for the first and subsequent pages to printer 110 in parallel with computer 104 processing the command stream. Thus, printer 110 can operate in parallel to print the first copy of the document. It can be seen, however, that if printer 110 were designed in accordance with the prior art (i.e., if printer 110 required that the copy_count command be in the preamble of the print job) then this same parallel operation would not be possible. This is because computer 104 needs to process nearly the entire command stream before it can generate the copy count command. Thus, print data can not be sent before this processing is accomplished.

To illustrate a second aspect of the present invention, it is assumed that printer 11 and printer 110 can respond to a "proof and hold" command in the trailer section of a print job. A print job having this command structure is generally indicated in Table 3.

TABLE 2

| Print Job command structure | Comments |
| --- | --- |
| @ PJL Job | Preamble section |
| @ PJL SET_ HOLD = {PRINT_AND_DEFER } | |
| {rest of preamble section} | |
| {print data} | Print Data describing each page in a document (e.g., PCL) |
| @ PJL COPY_COUNT = Copy count value | Trailer section |
| @ PJL HOLD = PROOF_AND_HOLD | |
| {rest of trailer section} | |
| @ PJL EOJ | |

It is understood that the "@ PJL HOLD=PROOF_AND_HOLD" represents a further extension to the current PJL command set. As just indicated, this command is generally referred to herein as a "Proof and hold" command.

The proof and hold command indicates to a compatible printer that the printer is to print a first copy of the document and wait until a "print" command or a "release" command is received. Both the print command and cancel command may be received from a user via a local user input device (e.g, a keypad connected to the printer).

One use of this second aspect of the present invention is that it allows a user to proof a first copy of a document before additional copies are made. Thus, for example, if after reviewing the first printed copy the user decides not to print the additional copies, the user can interact with the local user input device to cancel the current print job. As a result of this, the stored print data is deleted. If, however, the user determines additional copies are to be generated, the user can cause the release command to be generated and the printer proceeds to print the additional copies.

Figure 6:
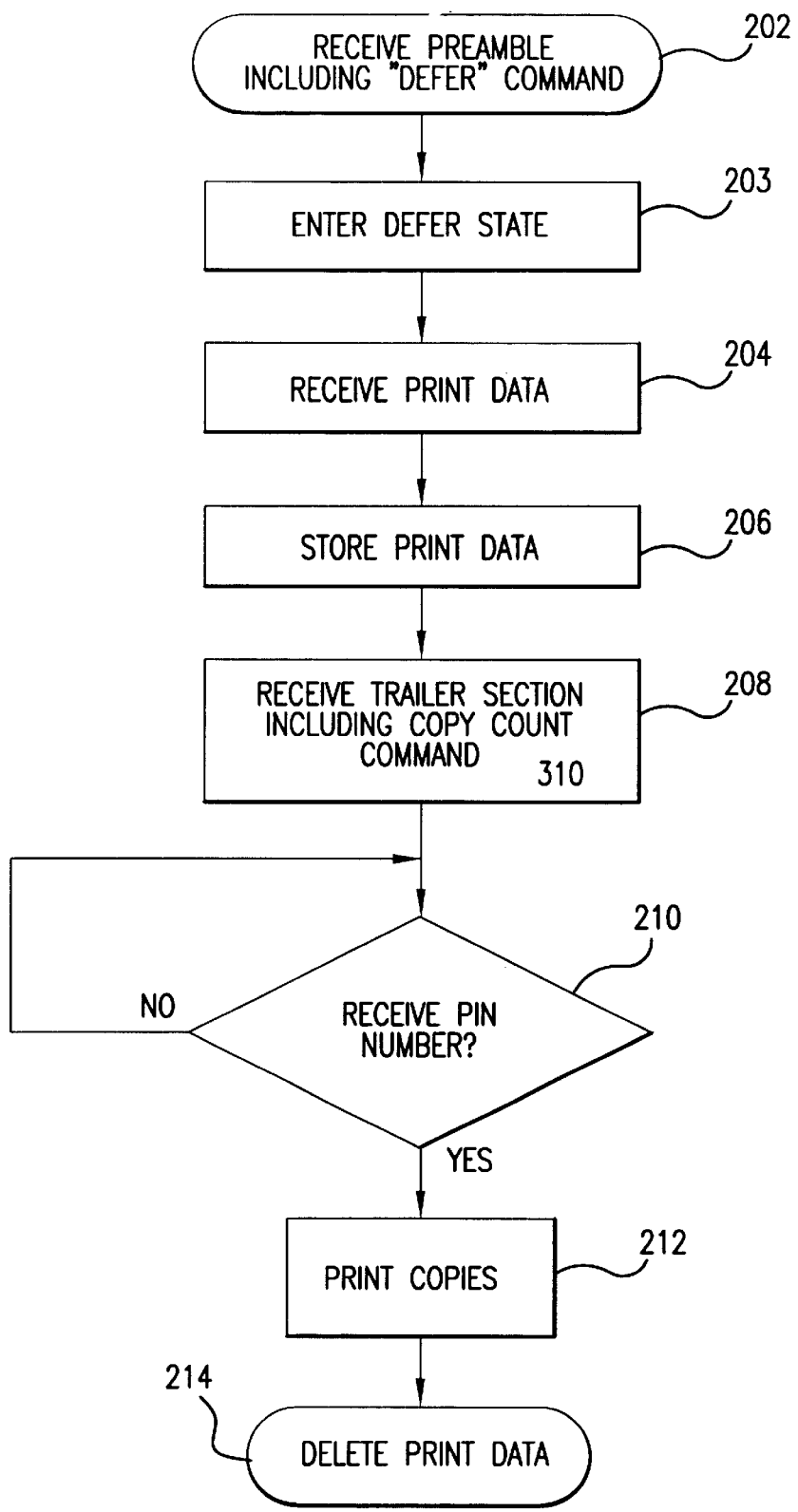
FIG. 6 depicts a flow diagram describing a routine for controlling a printer in order to provide secure printing.

In a third aspect of the present invention, printers are provided that allow for improved secure printing. To illustrate this aspect, FIG. 6 is provided. FIG. 6 depicts an embodiment of the present invention in the form of a method of controlling a printer. In this embodiment, it is assumed that the printer includes a local user interface that enables a user to enter a Personal Identification Number (PIN) and a storage area (print data storage area) for storing received print data. In addition, it is assumed that the printer is adapted to receive and to respond to a print job having a command structure generally indicated in Table 3. In this embodiment, it is again assumed these commands are expressed in Printer Job Control Language (PJL).

TABLE 3

| Print Job command structure | Comments |
| --- | --- |
| @ PJL Job | Preamble section |
| @ PJL SET_ HOLD = DEFER | |
| {rest of preamble section} | |
| {print data} | Print Data (e.g., PCL) |
| @ PJL COPY_COUNT = Copy count value | Trailer section |
| @ PJL HOLD_KEY = PIN Number | |
| {rest of trailer section} | |
| @ PJL EOJ | |

It is understood that the "@ PJL SET_HOLD=DEFER" and the "@ PJL HOLD_KEY=PIN Number" both represents a further extension of the current PJL command set. The @ PJL SET_HOLD=DEFER command is generally referred to herein as a "defer" command. In addition, the "PJL HOLD_KEY=PIN Number" is generally referred to herein as the "hold_key command". The response of the printer to these command is discussed in detail below.

Turning now to FIG. 6, the method of operation is now described. The operation begins upon the printer receiving a preamble section of a print job that includes a defer command (step 202). In response to the defer command, the printer then enters a "defer" state (step 203) for the current print job.

In general, while in a defer state, the printer is adapted to receive print data (step 204) and to store the print data as it is received into the print data storage area (step 206). Importantly, the print data is not printed. In addition, upon receiving the trailer section of the print job that includes the hold_key command (step 208) the printer waits until the PIN number indicated by the hold_key command is entered via a local user interface (e.g., a key pad connected to the printer or via insertion of a memory card into a card reader connected to the printer). Upon determining that the PIN number has been supplied (decision step 210), the printer responds by using the stored print data to print the copies indicated by the COPY_COUNT command (step 212). After the copies have been printed, the printer then proceeds to delete the print data (termination step 214).

It should be understood that the foregoing description is only illustrative of the invention. Various alternatives and modifications can be devised by those skilled in the art without departing from the invention. For example, in Table 2 the command structure indicated only a single Print_and_defer command. In other embodiments, the printer is adapted to receive and respond to more than one print_and_defer command. For each one of these commands received (either in the preamble section of the print job or in the trailer section of the print job), the printer is adapted to generate a single copy of the document. This could be useful in situations where a computer is able to identify that one additional copy should be printed (prior to knowing the actual copy count value). Accordingly, the present invention is intended to embrace all such alternatives, modifications and variances that fall within the scope of the appended claims.

What is claimed is:

1. A method of controlling a printer upon receiving a print job, said print job including a preamble section including a first command, print data describing a document and a trailer section including a second command, said first command indicating said print data is to be stored and said second command indicating a copy count value, said method comprising:
   (a) responding to said first command by storing said print data; and
   (b) responding to said second command by using said print data to print a first number of copies of said document.

2. The method of claim 1, wherein said first command is a print_and_defer command; and further comprising: further responding to said first command by printing a single copy of said document.

3. The method of claim 2, wherein said first number of copies equal to said copy count value less one.

4. The method of claim 1, wherein said first number of copies equal to said copy count value.

5. The method of claim 4 wherein said first command is a defer command and said trailer section includes a third command indicating step (b) is to be performed only upon receiving a PIN number; and wherein step (b) is performed upon receiving said PIN number.

6. The method of claim 4, wherein said first command is a defer command and said trailer section includes a third command indicating step (b) is to be performed only upon receiving a release command; and wherein step (b) is performed upon receiving said release command.

7. A printer comprising:
   (a) means for receiving a print job, said print job including a preamble section, print data describing a document and a trailer section, said preamble section including a first command indicating said print data is to be stored, said trailer section including a second command indicating a first number of document copies are to be printed;
   (b) a memory; and
   (c) means for responding to said first command by storing said print data into said memory; and
   (d) means for responding to said second command by using said print data to print a second number of copies of said document.

8. The printer of claim 7, wherein said first command further indicates a single copy of said document is to be printed; and further comprising: means for further responding to said first command by using said print data to print a single copy of said document.

9. The printer of claim 8, wherein said second number is equal to said first number less one.

10. The printer of claim 7, wherein said second number of copies equal to said first number of copies.

11. The printer of claim 10, further comprising means for receiving a PIN number; and said second command responding means adapted to print said second number of copies only upon said PIN number receiving means receiving said PIN number.

12. The printer of claim 10, further comprising means for receiving a PIN number, and wherein said trailer section includes a third command indicating said first number of copies are to be printed only upon receiving said PIN number; and said second command responding means adapted to print said second number of copies only upon said PIN number being received by said PIN number receiving means.

13. The printer of claim 9, further comprising means for receiving a release command; and said second command responding means adapted to print said second number of copies only upon said release command receiving means receiving said release command.

14. The printer of claim 10, further comprising means for receiving a release command; and said second command responding means adapted to print said second number of copies only upon said release command receiving means receiving said release command.

15. A document processing device, comprising:
   (a) means for generating a document in an electronic form;
   (b) means for converting said document into a print job, said print job including a preamble section including a first command, print data describing said document and a trailer section including a second command, said first command for causing a printer to store said print data and said second command for causing said printer to print a first number of copies.

16. The document processing device of claim 14, wherein said first command is further for causing said printer to print a single copy of said document.

17. The document processing device of claim 14, further comprising:
   (a) means for determining a copy count value; and wherein said first command further for causing said printer to print a single copy of said document and said first number equal to said copy count value less one.

18. The document processing device of claim 14, further comprising:
   (a) means for transmitting said print job to said printer by first transmitting said preamble section, and after transmitting said preamble section then transmitting said print data and after transmitting said print data then transmitting said trailer section.

19. The document processing device of claim 15, further comprising:
   (a) means for transmitting said print job to said printer by first transmitting said preamble section, and after transmitting said preamble section then transmitting said print data and after transmitting said print data then transmitting said trailer section.

* * * * *